No. 760,632. Patented May 24, 1904.

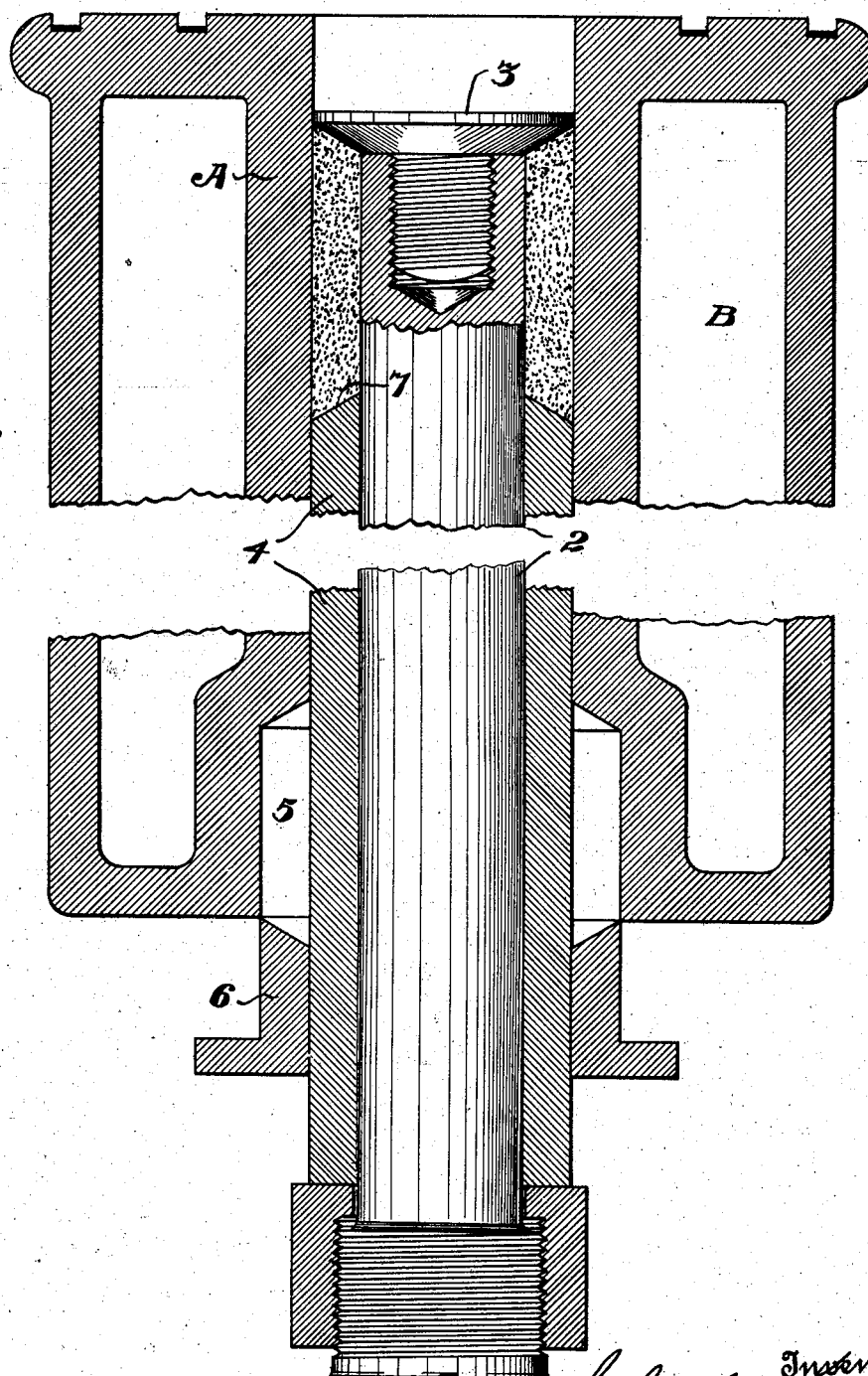

UNITED STATES PATENT OFFICE.

JOHN C. KITTON, OF SAN FRANCISCO, CALIFORNIA.

COMPRESSIBLE PISTON-PACKING.

SPECIFICATION forming part of Letters Patent No. 760,632, dated May 24, 1904.

Application filed September 30, 1903. Serial No. 175,166. (No model.)

*To all whom it may concern:*

Be it known that I, JOHN C. KITTON, a citizen of the United States, residing in the city and county of San Francisco and State of California, have invented new and useful Improvements in Compressible Piston-Packing, of which the following is a specification.

My invention relates to an improvement in piston-packing and a means for adjusting the same.

It consists in forming the piston with a reduced portion or chamber between itself and the inner sides of the cylinder in which it operates and in the employment of a sleeve inclosing the piston-rod and passing with it out through the gland or stuffing-box, said sleeve being movable with relation to the piston-rod and having its upper end forming one portion of the piston-chamber. Within this chamber a suitable compressible packing is placed, and this can be moved or adjusted from the outside without opening the cylinder.

Referring to the accompanying drawing, the figure is a vertical central section of cylinders, showing my invention.

I have shown my invention as here applied to a cylinder A of an elastic-fluid compressor formed in the usual manner with surrounding water-jacket B and having valves through which the gas is admitted and discharged from the upper end of the cylinder.

As shown in the drawing, 2 is the piston-rod, having an end or follower 3 fixed to the end of the rod within the cylinder.

4 is a sleeve fitting snugly upon the piston-rod and extending out through the stuffing-box 5 and the gland 6, which fits therein.

The inner face of the follower 3 and the end 7 of the sleeve are here shown as beveled and forming a chamber between them, the size of which is substantially equal to the thickness of the sleeve. Within this space I place a filling of compressible material of any suitable or desired description which will serve as a packing for the piston and prevent leakage. I have found that a compound made of Babbitt metal broken into small irregular pieces sufficient to lie within this chamber and of graphite, mixed with any suitable binder, such as oil or other material, is very suitable for the purpose.

The sleeve 4 is capable of being turned from the outside and advanced with relation to the piston-rod and the packing, and the latter will be compressed between the inner end 7 of the sleeve and the head or follower 3 of the piston-rod, thus making a tight joint.

Any adjustment of this packing can easily be made from the outside and without removing any of the other parts.

Having thus described my invention, what I claim, and desire to secure by Letters Patent, is—

1. The combination with a piston-rod having a head or follower, of a sleeve extending along the rod and through the stuffing-box whereby it is capable of longitudinal advancement from the outside, and a compressible packing or filling surrounding the rod between the inner end of the sleeve and the follower.

2. The combination with a piston-rod and a head or follower fitted to the end within the cylinder, of a sleeve fitting the piston-rod extending inwardly through the stuffing-box having the inner end fitting the interior of the cylinder, means for advancing the sleeve with relation to the piston-rod and a compressible packing located within the chamber between the sleeve and the head or follower.

In testimony whereof I have hereunto set my hand in presence of two subscribing witnesses.

JOHN C. KITTON.

Witnesses:
HENRY C. DROGER,
JAMES L. KING.